United States Patent [19]

Jagiella et al.

[11] Patent Number: 5,366,164
[45] Date of Patent: Nov. 22, 1994

[54] NOZZLE COMPRISING BREAK-OFF REGION

[75] Inventors: Manfred Jagiella, Karlsruhe; Michael Holzmann, Rastatt; Georg Spörl, Gaggenau; Ahmet Topkaya, Karlsruhe, all of Germany

[73] Assignee: Precitec GmbH, Gaggenau-Bad Rotenfels, Germany

[21] Appl. No.: 847,264

[22] Filed: Mar. 10, 1992

[30] Foreign Application Priority Data

Mar. 22, 1991 [DE] Germany .............................. 4109567

[51] Int. Cl.⁵ .................. B05B 5/00; B05B 1/00
[52] U.S. Cl. .................... 239/600; 239/690; 118/323; 118/631; 118/663
[58] Field of Search ............ 239/600, 288, 690; 118/631, 323, 663; 68/250 R; 134/172; 222/541

[56] References Cited

U.S. PATENT DOCUMENTS 5,135,014 8/1992 Beswick ........................ 134/152

FOREIGN PATENT DOCUMENTS

| 4035403.2 | 5/1992 | Germany . |
| 63-56390 | 3/1988 | Japan . |
| 63-104796 | 5/1988 | Japan . |
| 63-281788 | 11/1988 | Japan . |
| 2-80192 | 3/1990 | Japan . |

*Primary Examiner*—Andres Kashnikow
*Assistant Examiner*—Christopher G. Trainor

[57] ABSTRACT

A nozzle for a device for machining materials, can be rigidly connected at its end opposite the nozzle tip to a connector head of the device. The connection of the nozzle with the connector head is made by a connecting element (7; 17) made of a brittle material and comprising a break-off region (11; 20). If a collision between the nozzle tip and a workpiece to be machined takes place accidentally, then the connecting element breaks in the break-off region in order to prevent further, even greater damage to the connector head, nozzle or workpiece. The break-off region is crossed by an electrical conductor (14; 27) which breaks in the event of a collision, so that in this way an alarm signal for stopping the device can be generated.

29 Claims, 4 Drawing Sheets

NOZZLE COMPRISING BREAK-OFF REGION

BACKGROUND OF THE INVENTION

The invention concerns a nozzle for a device for machining materials, wherein the nozzle can be rigidly connected at its end opposite the nozzle tip to a connector head of the device.

DESCRIPTION OF THE BACKGROUND ART

A nozzle of this kind is already universally known. It contains an electrically conductive nozzle body to the tip of which a nozzle electrode which is electrically insulated therefrom is attached, using an electrically conductive union nut which engages with the nozzle body.

In the known nozzle, the nozzle electrode is screwed into the tip of a hollow cylindrical ceramic body, so that it is rigidly connected thereto. The ceramic body is then pressed against the tip of the nozzle body, this being by means of the union nut which is fitted over the ceramic body and screwed to the nozzle body. This union nut leaves the nozzle electrode completely free and serves inter alia to shield a wire in the ceramic body by which the nozzle electrode is connected to a contact piece on the nozzle body which is in turn connected to a connector socket which is provided on the nozzle body and serves to receive a coaxial cable.

The nozzle can be used e.g. for machining workpieces with laser radiation, for example for cutting a workpiece with a high-power laser beam. The laser beam in the process passes through a channel in the nozzle center, which also leads through the ceramic body and the nozzle electrode.

The nozzle electrode is used for capacitive measurement of distance, in order to be able to guide the nozzle relative to the workpiece. For this, a sensor signal delivered by the nozzle electrode and appearing at the output of the above-mentioned connector socket is further processed.

In order to protect the sensor signal from external disturbing influences, shielding is carried out, for example active shielding, which means that the sensor signal occurring at the nozzle electrode is transmitted via an amplifier with a gain $V=1$ to the shield. In the known nozzle, however, the shield ends in the region of the union nut, so that a very large electric leakage field occurs between nozzle electrode and workpiece, as the nozzle electrode is located outside the union or retaining nut. This leads to high lateral sensitivity of the sensor system, so that for example workpiece structures located very close to a cutting line have a strong influence on adjustment of the nozzle position, which is undesirable.

In the known nozzle, however, the ceramic body performs a certain safety function, as it can break if the nozzle electrode accidentally collides with a workpiece. This separation of the nozzle electrode from the nozzle body by breakage prevents further damage to the nozzle or to the connector head carrying it in such cases, so that destruction of the ceramic body can be tolerated in such a case, although it is relatively expensive.

In the further course of development of suitable nozzles, it was endeavoured to continue the shield into the tip region of the nozzle electrode, in order to obtain a smaller leakage field and hence better resolution when guiding the nozzle.

In a nozzle redesigned accordingly, the retaining element then receives the nozzle electrode and presses it against the ceramic body. Between the retaining element and nozzle electrode is located an electrically non-conductive layer. Since on the other hand the retaining element is in electrical contact with the nozzle body to which the screen potential is applied, the shield can therefore be continued into the region of the tip of the nozzle electrode. In addition, the electric field between the nozzle electrode and the workpiece is concentrated on the tip region of the nozzle electrode, so that there is hardly any leakage field any more. The lateral sensitivity of the sensor system is considerably reduced thereby. It does not therefore respond so fast to object structures which are located e.g. adjacent to a cutting path, so that in this way more satisfactory guiding of the nozzle or adjustment of distance is possible.

As the nozzle electrode is now located mainly inside the retaining element and protrudes out of it only by its tip, however, the safety action of the ceramic body is lost, because if the nozzle collides with the workpiece, the forces arising are essentially absorbed by the retaining element. Considerable damage can therefore occur to the nozzle or connector head unless additional measures are provided, for example tactile sensors in the vicinity of the nozzle electrode, which indicate inadmissible proximity of the nozzle electrode to the workpiece and prevent it by control techniques. Tactile sensors of this kind, however, take a relatively large amount of space and thus in turn prevent freedom of movement of the nozzle, which is particularly undesirable if three-dimensional workpiece machining is to take place.

Particularly for three-dimensional workpiece machining, very slender nozzles are sought, in which however a ceramic component at the nozzle tip is dispensed with for achieving this purpose. These nozzles thus likewise have no safety device which could restrict damage if the nozzle collides with a workpiece, apart from the above-mentioned tactile sensors which, however, cancel out again the advantage of a particularly slender nozzle.

SUMMARY OF THE INVENTION

It is the object of the invention to provide a nozzle of the kind mentioned hereinbefore which on the one hand can be shielded up to a point far into the tip region, which on the other hand allows a slender construction of its nozzle tip and which further is also capable, without using sensors, of reliably preventing greater damage to the nozzle, to the connector head holding it or to the workpiece if the nozzle collides with a workpiece.

The solution for achieving the set object is distinguished in that
    the nozzle can be connected to the connector head by
        a connecting element made of a brittle material and
        the connecting element comprises a break-off region.

If the nozzle tip or nozzle electrode accidentally collides with a workpiece, then the connecting element breaks in the break-off region and thus releases the nozzle from the connector head. Nozzle, connector head and workpiece therefore cannot suffer any more damage after the collision, apart from minor damage which may possibly arise due to the nozzle striking the workpiece after the connecting element has broken.

A broken connecting element can very quickly be replaced by a new one without having to dismantle the nozzle, as is the case in the state of the art. The connecting element can furthermore be made more cheaply than in the state of the art. The connecting element can be an ordinary turned part, for example.

When choosing the material for the connecting element, allowance must be made for the fact that it should be extremely brittle in order to be able to break easily. In case of a collision there must not be permanent plastic deformation, as is the case e.g. with copper. The material may of course exhibit a limited elastic, but not plastic range under stress, wherein breakage must occur in a definite manner under excessive stress. The connecting element should further be temperature-stable, as nozzles of the above kind can become very hot. Under no circumstances must breakage occur as a result of great heat. For shielding purposes and for purposes of signal transmission, the material should on the other hand be capable of being coated conductively. On the other hand the material must be capable of being machined in order to be able to form break-off regions, inter alia. The material should furthermore be suitable for manufacture by injection moulding and be incombustible or self-extinguishing.

According to an advantageous development of the invention, the connecting element is constructed as a cylinder which is coaxial with the longitudinal axis of the nozzle and the side wall of which comprises at least one peripheral groove forming the break-off region.

The peripheral groove may be located e.g. in the outer or inner surface of the cylinder. But there may be several peripheral grooves adjacent to each other, which are provided on both sides of the cylinder. An end face region of the cylinder is then rigidly connected to the nozzle, while the other end face region of the cylinder is rigidly connected to the connector head, wherein the grooves come to lie between connector head and nozzle. The grooves can have such a depth that the stability of the cylinder under normal operating conditions is still sufficient to keep the nozzle on the connector head. If, on the other hand, the nozzle collides with an obstacle by its tip, then the cylinder breaks in a predefined manner in the region of the peripheral grooves, that is, in the break-off region, and releases the nozzle from the connector head. In The process there remain both in the nozzle and in the connector head predefined, relatively large cylinder portions which can then easily be removed from the respective elements in order to be able to insert a new connecting element.

The cylinder can easily be manufactured as a turned part, so that it can be produced relatively cheaply. For instance, it can be provided with internal and external threads, so that it can be screwed by its internal thread onto a nozzle body belonging to the nozzle, while its external thread can be screwed into a corresponding threaded bore of the connector head. The reverse case is conceivable too.

According to another advantageous development of the invention, the connecting element is constructed as a ring wheel which is coaxial with the longitudinal axis of the nozzle and which, at least in one of its flat wheel surfaces, comprises at least one coaxial annular groove forming the break-off region. This ring wheel too can have one or more annular grooves, if occasion arises on both sides of the wheel, in order to obtain as definite as possible a break-off region.

The ring wheel can advantageously be provided with internal and external threads, so that it is also screwed by its internal thread onto a nozzle body belonging to the nozzle and can be connected by its external thread to the connector head.

For this, onto the external thread of the ring wheel can be screwed a ring flange made of fracture-resistant material which is located in its wheel plane and via which the connection with the connector head is then finally made, e.g. by a suitable clamping means or the like. But the ring flange also serves to keep the effective area of the ring wheel relatively small. During operation of the nozzle, there builds up inside it a relatively high gas pressure which leads to high stress on the ring wheel. Due to a smaller effective area of the ring wheel, therefore, the forces acting on it are reduced, so that it does not break involuntarily during normal operation. The annular grooves too must be dimensioned to allow for the internal pressure of the nozzle.

According to another development of the invention, the ring wheel can also be screwed by its external thread into a flange of the nozzle, wherein it can be connected by its internal thread to the connector head. For this, e.g. a connecting cylinder of the connector head can be screwed into the internal thread.

According to a very advantageous further development of the invention, the connecting element is made of electrically insulating material, wherein the break-off region is crossed by an electrical conductor which breaks if the break-off region breaks.

As a result it is possible to detect breakage of the connecting element, in order to stop the machining device if a collision has occurred. The conductor may also be a wire strain gauge, so that even before breaking, inadmissible proximity of the nozzle to an obstacle can be detected, in order still to be able to avoid breakage in certain circumstances.

If normally a current flows through the electrical conductor, then this current is interrupted on breakage of the connecting element. In this way a warning and control signal is obtained which can be used e.g. to stop means for moving the machining device, to switch off a laser the beam of which passes through the nozzle, in order thus to prevent the nozzle from being damaged by the laser beam, and the like. The warning and control signal is generated by means of a monitoring circuit to which the nozzle can be connected.

To generate the warning and control signal, therefore, the flow of current through the electrical conductor is monitored. For supply of the current to the electrical conductor on the connecting element, there are several possibilities.

For example, the electrical conductor can be directly connected to additional power cables via which electrical current is supplied. But potentials already existing within the nozzle can also be used to let a current flow through the electrical conductor on the connecting element. In this case, then, the electrical conductor is connected in series with a resistance. The electrical conductor can also be made directly from resistance material.

For example, it is possible for the above purpose to use the screen potential already existing at the nozzle on the one hand, and an earth potential already existing at the connector head on the other hand. Between these two potentials then comes the series circuit or the electrical conductor of resistance material. In this case the above potentials must be conducted in a suitable manner to the electrical conductor, for which e.g. parts of the connecting element may be coated conductively.

But on the other hand it is also possible to connect the electrical conductor in series with a resistance between sensor potential and screen potential. There are already nozzles of the above kind which have a characteristic impedance with a predefined resistance value, above which an interrogation current flows. A nozzle of this kind is described e.g. in German patent application P 40 35 403.2. The above-mentioned resistance lies between the core of the coaxial cable leading to the sensor, and the shield. If this conductive connection is cut and the above-mentioned electrical conductor is connected in series with the resistance, then by monitoring the current between core and shield not only can be nozzle used the detected, but also a breakage of the connecting element can be ascertained. In this case too, of course, the electrical potentials are to be applied in a suitable manner to the electrical conductor on the connecting element.

The above-mentioned resistance, which is in series with the electrical conductor, can also be located e.g. on the connecting element or be completely omitted if the electrical conductor is made of resistance material and has a predefined resistance. In such a case, nozzle identification can also be carried out via the electrical conductor.

The electrical conductor is preferably formed by depositing electrically conductive material, for example by chemical precipitation or by vacuum vapour deposition. For instance, chromium can be applied by vapour deposition to produce the electrical conductor. Preferably there is used a material which will definitely break in every case if the connecting element breaks in the break-off region. Chromium is particularly suitable for this.

According to another advantageous development of the invention, the electrical conductor overlaps the break-off region in a meander-like fashion in the longitudinal direction thereof. In this way, the whole break-off region can be monitored, so that the collision signal can be detected even more reliably.

According to a very advantageous development of the invention, the connecting element is made of polyvinylene sulphide, which meets all the set material requirements and furthermore is cheap.

Another advantageous development of the invention lies in that the nozzle is positioned within a cap which leaves the tip of the nozzle free and which is attached to the connector head and of which the inner surface is metallised.

If therefore a collision occurs between the nozzle tip and workpiece, then on the one hand after breakage of the break-off region the nozzle does not fall uncontrolled onto the workpiece. This leads to a further restriction of damage. On the other hand, at the same time the nozzle comes into contact with the metal coating on the inner surface of the cap, so that as a result an additional warning and control signal can be generated by means of the monitoring circuit. When the nozzle contacts the cap, for example the screen potential of the nozzle is applied to the metal coating of the cap, which results in a corresponding signal if the potential of the cap metal coating is monitored. This warning and control signal generated by means of the cap can be generated instead of or in addition to the above-mentioned warning and control signal which is generated on breakage of the electrical conductor which is arranged in the break-off region.

In order to prevent a warning and control signal of this kind from being generated on contact between cap and nozzle already when the cap is only bent, there may be provision for carrying out stopping of the devices only when a predetermined period has lapsed since contact between cap and nozzle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the invention are described in more detail below with reference to the drawings which are given by way of illustration only, and thus are not limitative of the present invention, and wherein.

DETAILED DESCRIPTION OF THE PREFERRED EMBODIMENTS

Figure 1:
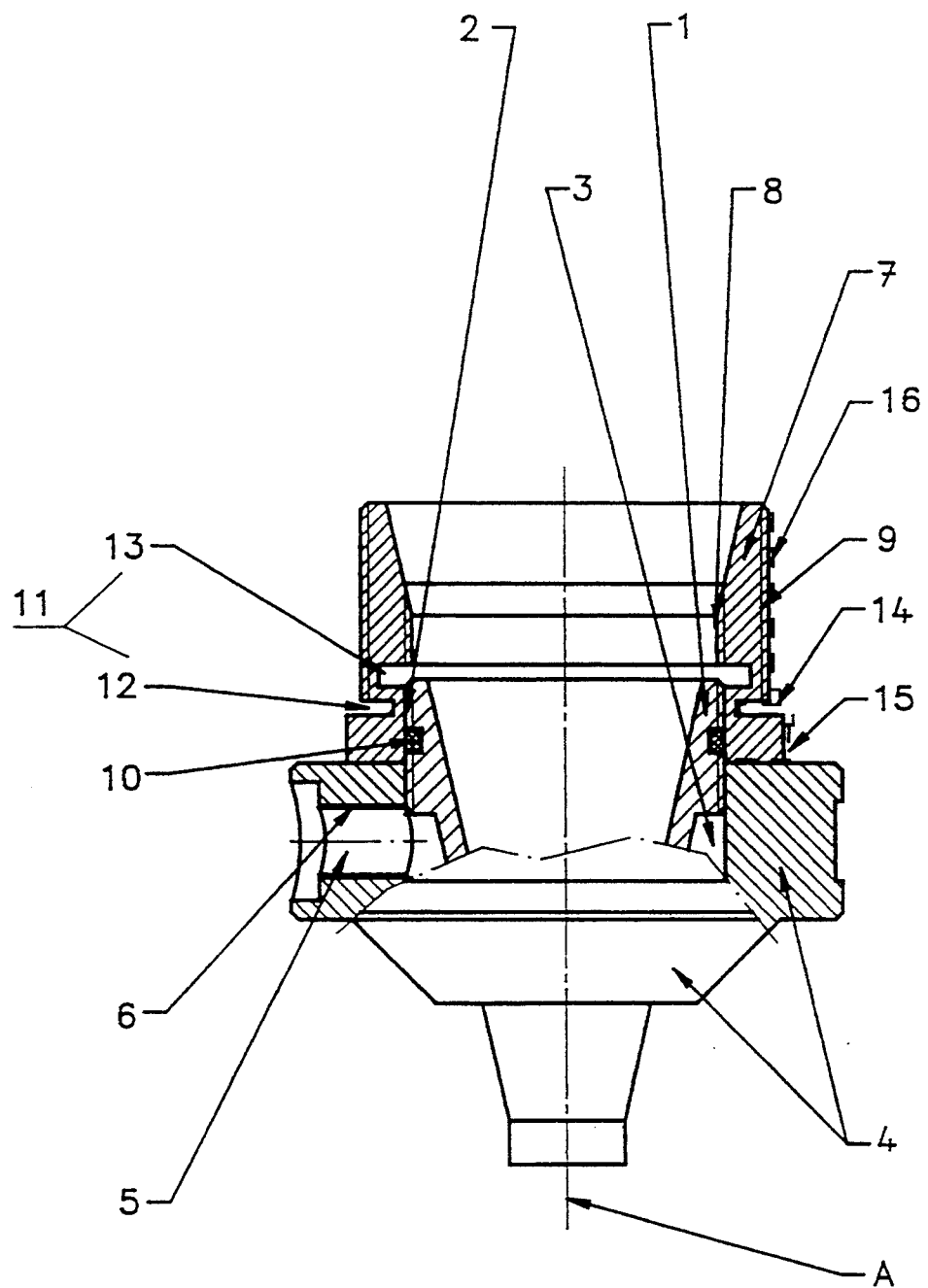
FIG. 1 a nozzle with cylindrical connecting element.

FIG. 1 shows a nozzle according to the first embodiment of the invention. This nozzle is however shown without a nozzle electrode and the device holding it in its lower region.

According to FIG. 1, the nozzle comprises a nozzle body 1 which is made of metallic material, e.g. steel. The nozzle body 1 is continuously conical on the inside and also conical in its lower tip region on the outside. In the upper region the nozzle body 1 is cylindrical on the outside and there comprises an external thread 2. By the external thread 2 the nozzle body 1 is screwed into an internally threaded opening 3 in an outer sheath 4 of the nozzle. The outer sheath 4 extends only approximately as far as the lower one-third of the nozzle body 1, so that the latter protrudes beyond the outer sheath 4. Into the outer sheath 4 a bush, not shown, can be screwed from below, overlapping the nozzle body 1. The bush, not shown, serves to attach a nozzle electrode, also not shown, to the tip of the nozzle body 1. In this case the bush can be electrically insulated from the nozzle electrode, and the tip region of the nozzle body 1 from its wider upper region.

The outer sheath 4 further comprises a radial through-channel 5 with an internal thread 6, so that a connector socket, not shown, can be screwed into the radial through-channel 5. The connector socket has a central, insulated inner conductor as well as an externally threaded outer conductor, wherein this external thread engages in the internal thread 6 and is in electrical contact with the outer sheath 4. The connector socket serves to connect a coaxial cable.

As can be seen with reference to FIG. 1, the nozzle body 1 is only partly screwed into the outer sheath 4, e.g. so far that another two-thirds of the external thread 2 come to lie above the outer sheath 4. Onto this exposed external thread 2 of the nozzle body 1 is screwed a cylinder 7 which serves as a connecting element for a connector head, not shown, and which for this purpose comprises an internal thread 8. The cylinder 7 is further provided with an external thread 9, so that it can be screwed into an opening in the connector head provided with a corresponding internal thread. In this way the nozzle is rigidly connected by the cylinder 7 to the connector head.

The cylinder 7 is made of a brittle material, for example polyvinylidene sulphide (PPS) or ceramic material, and is therefore electrically insulating. The connector head is separated by it from the nozzle with respect to potential.

As can be seen, the cylinder 7 is screwed onto the external thread 2 of the nozzle body 1 until it comes to lie with its end base surface on the connector sheath 4. In this case there can be a sealing ring 10 between the inner wall of the cylinder 7 and the cylindrical outer wall of the nozzle body 1, in order to prevent escape of gases at this point from the interior of the nozzle.

Just above the sealing ring 10 and in the end face region of the nozzle body 1, the cylinder 7 comprises a break-off region 11. The break-off region 11 is formed by two peripheral grooves 12 and 13 which are located in the wall of the cylinder 7. The peripheral groove 12 is in this case located in the outer wall of the cylinder 7, while the peripheral groove 13 is located in the inner wall of the cylinder 7. The two peripheral grooves 12 and 13 lie very close to each other, so that between them the wall of the cylinder 7 has a meander-like shape. The wall thickness of the cylinder 7 in the region of the peripheral grooves 12 and 13 is here selected such that the cylinder 7 does not normally break even with maximum acceleration during movement of the nozzle as well as with maximum internal pressure of the nozzle. Only when the nozzle strikes an obstacle with its tip, for example the workpiece to be machined, are such great forces transmitted to the break-off region 11 that it breaks. The break-off region is relatively strictly limited by the annular grooves 12 and 13 here, so that a neat separation of the nozzle from the connector head takes place. The remaining parts of the cylinder 7 after a collision of the nozzle with the obstacle can easily be taken off the connector head and nozzle, as they only need to be unscrewed. The insertion of a new cylinder is therefore completely free from problems. For this purpose it is not necessary to dismantle the nozzle into further component parts, so that exchange of the cylinder can also be carried out within a short time.

As already mentioned, the cylinder 7 is made of brittle, electrically insulating material. For monitoring the break-off region 11, therefore, the cylinder 7 may carry an electrical conductor which is applied e.g. to the cylinder 7 by vapour deposition and crosses the break-off region 11 once or more times in the axial direction of the cylinder 7. The electrical conductor may also be applied chemically. It is given the reference number 14 in FIG. 1. The electrical conductor 14 is located on the outer surface of the cylinder 7 and practically covers the upper groove 13. Further, the electrical conductor 14 extends through the lower groove 12 and ends shortly after on the surface of the cylinder 7. A path of this kind may be provided at several points in the circumferential direction of the cylinder 7, wherein overall a meander-like structure of the electrical conductor 14 results, as seen in the circumferential direction of the cylinder.

Through the electrical conductor 14 flows a current which is monitored by means of a sensor device, not shown. If the flow of current is interrupted, this indicates breakage of the break-off region 11. For in this case the conductor 14 breaks too.

The conductor 14 in FIG. 1 may be for example between earth potential and screen potential, wherein the conductor 14 is further connected in series with an electrical resistance or itself made of resistance material, to limit the current. The screen potential is usually present at the outer sheath 4 of the nozzle, wherein it is supplied to the outer sheath 4 via the screen conductor of the connector socket which is screwed into the radial through-channel 5. The screen potential can thus easily be transmitted from the outer sheath 4, which is made of metal, to one end of the electrical conductor, this being via a suitable metal coating 15 on the lower end face and circumferential surface of the cylinder 7. The metal coating on the lower end face of the cylinder 7 thus rests on the outer sheath 4 and transmits the screen potential via the outer and lower circumferential surfaces of the cylinder 7 to one end of the electrical conductor 14. The other end of the electrical conductor 14 can also be connected via an additional metal coating 16 on the outer circumferential surface of the cylinder 7 to a suitable contact on the connector head, wherein this contact (e.g. metal coating) is at earth potential. In the above case, the electrical conductor 14 is made of resistance material. If this is not so, there can be an additional resistance at the lower circumferential edge of the cylinder 7 between the metal coating on the end face and the lower end of the electrical conductor 14.

The metal coatings 15 and 16 can encompass the whole cylinder 7 in their respective regions. Between them then extends the meander-like electrical conductor 14 which is connected above the break-off region 11 at one point to the metal coating 16 and below the break-off region at one point to the metal coating 15, if occasion arises via an electrical resistance.

Unlike FIG. 1, there may be only one of the peripheral grooves 12 or 13. In this case an electrical conductor 14 is provided respectively only on the opposite wall of the cylinder 7 in the region of this peripheral groove.

Figure 2:
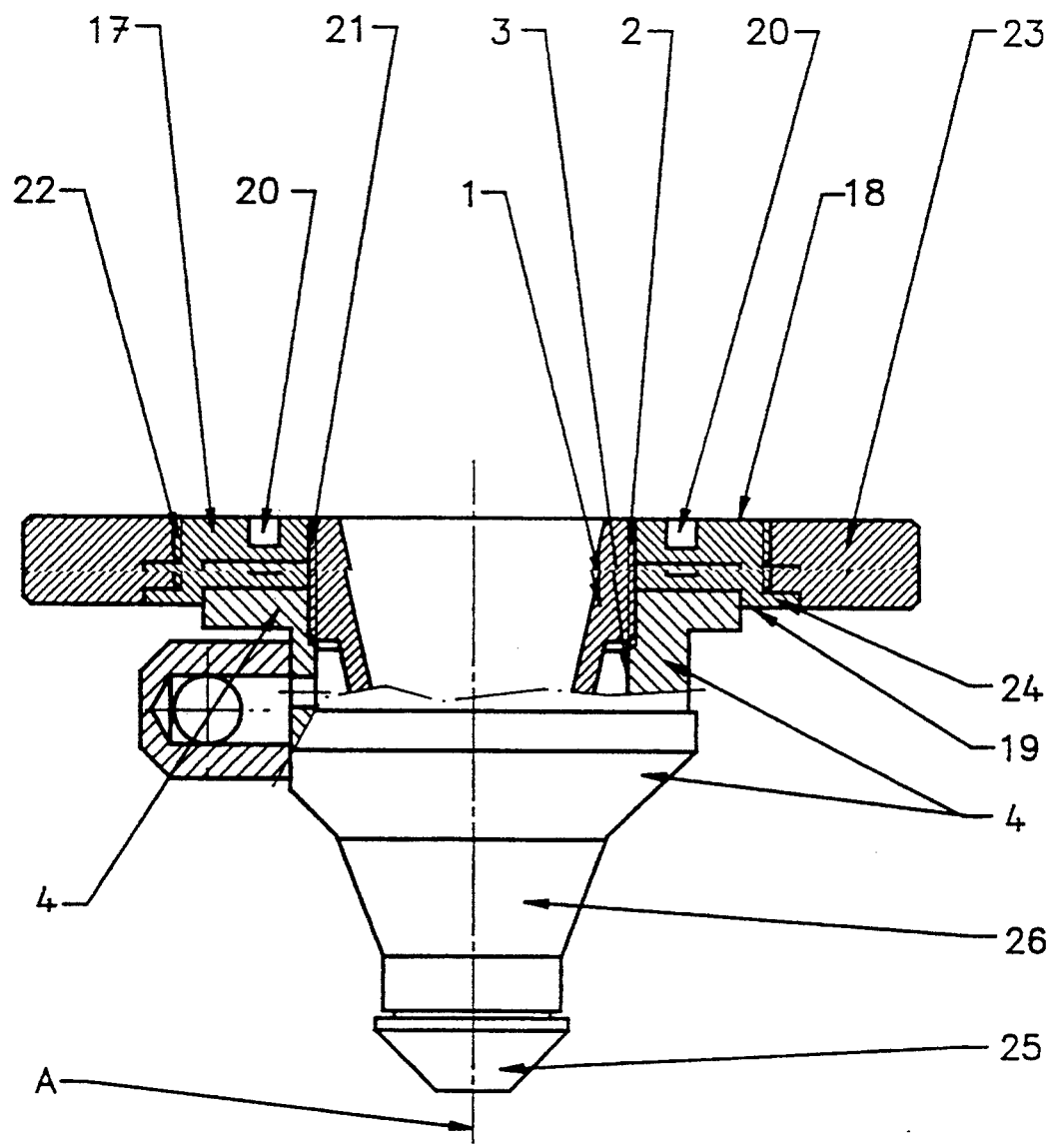
FIG. 2 a nozzle with ring wheel-shaped connecting element.

FIG. 2 shows a nozzle according to a second embodiment of the invention. The same parts as in FIG. 1 are here given the same reference numbers.

In the second embodiment, the brittle, electrically insulating connecting element is constructed as a ring wheel 17 which is coaxial with the longitudinal axis A of the nozzle and which at least in one of its flat wheel surfaces 18, 19 comprises at least one coaxial annular groove 20 forming the break-off region. The ring wheel 17 has an internal thread 21 and an external thread 22. By the internal thread 21 it is screwed onto the thread 2 of the cylindrical portion at the upper end of the nozzle body 1. On the other hand, onto its external thread 22 is screwed a ring flange 23 which is made of e.g. metal and serves to fix the nozzle to the connector head, not shown. In this case, the ring flange 23 can be clamped to the connector head in a suitable manner.

As in the case of FIG. 1, here too the nozzle body 1 is only partly screwed into the opening 3 in the outer sheath 4. Onto the remaining region of the nozzle body 1 is screwed the ring wheel 17, as mentioned, so that its upper surface is flush with the end face of the nozzle body 1. The ring wheel 17 in this case comes to rest by an attachment, as further explained with reference to FIG. 3, on the outer sheath 4. It further comprises on its lower wheel surface 19 a radial flange 24 for axially positioning the ring flange 23.

If the nozzle is clamped to the connector head by the ring flange 23, and if the nozzle electrode 25, which is drawn towards the tip of the nozzle body 1 by means of a bush 26 screwed into the outer sheath 4, accidentally collides with a workpiece, then the ring wheel 17 breaks in the region of its coaxial annular groove 20 if the forces arising exceed a given quantity. What forces on the nozzle electrode 25 lead to breakage of the ring wheel 17, depends on the dimensions of the annular groove 20. In case of collision, therefore, the nozzle comes away from the connector head, so that it, the connector head or the workpiece do not suffer greater damage. The remaining fragments of the ring wheel 17 can then easily be unscrewed and replaced by a new ring wheel 17. For this, the ring flange 23 is first removed from the connector head. The ring flange 23 can also directly form part of the connector head, so that the nozzle can be screwed directly by its ring wheel 17 into the connector head or into the ring flange.

Figure 3:
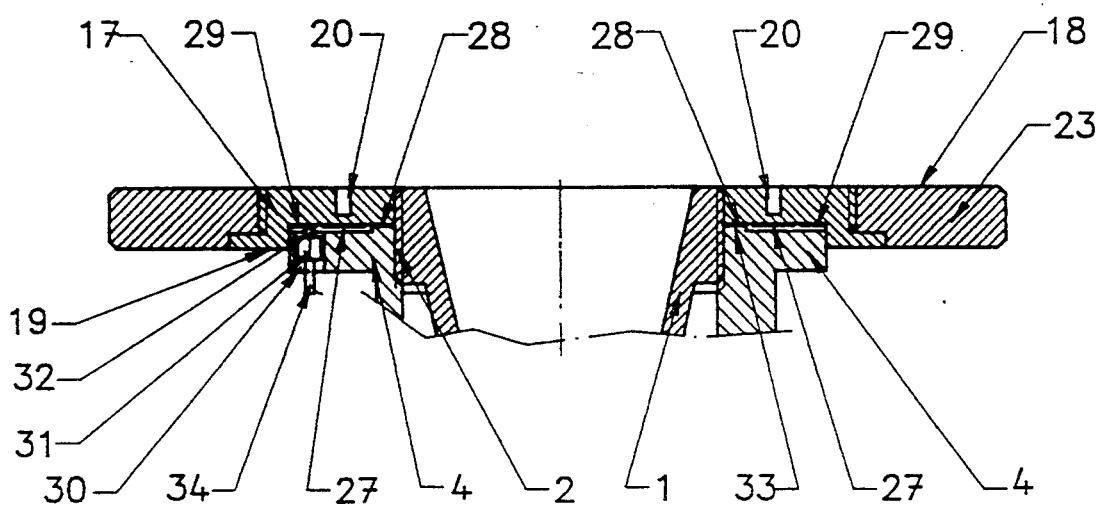
FIG. 3 an enlarged section through nozzle and ring wheel-shaped connecting element according to FIG. 2, FIG. 4 a plan view of the ring wheel-shaped connecting element according to FIG. 3 with ring flange, and FIG. 5 a nozzle with another ring wheel-shaped connecting element.
Figure 4:
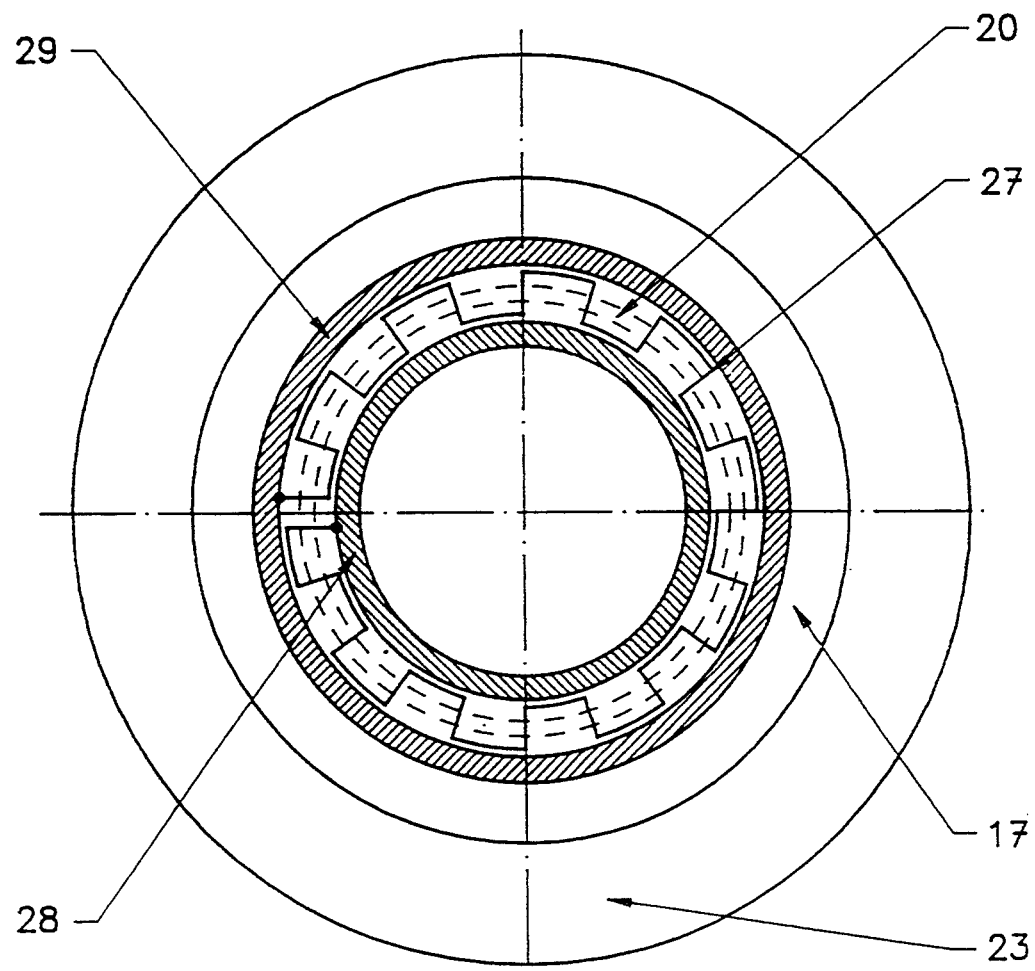

FIGS. 3 and 4 show in what manner the ring wheel 17 can be monitored for breakage of its break-off region 20.

According to FIG. 3, the ring wheel 17 is constructed in such a way that it comprises an axial recess in its lower surface 19 opposite the outer sheath 4. This recess extends over the whole circumference of the ring wheel 17. Within the recess, the ring wheel 17 carries a meander-like conductor 27 extending in the circumferential direction, which lies opposite the coaxial annular groove 20 and repeatedly crosses it in a radial direction. Located concentrically to the meander-like conductor 17 and also in the recess are an inner annular metal coating 28 and an outer annular metal coating 29. They are formed for example by electrically conductive material which has been applied to the ring wheel 17 by vapour deposition. The meander-like conductor 27 can be produced in a corresponding manner. It is connected by one end to the outer annular metal coating 29 and by another end to the inner annular metal coating 28 which also partly or completely covers the internal thread of the ring wheel 17. If the ring wheel 17 is thus screwed onto the external thread 2 of the nozzle body 1, which is made of metal, then the nozzle body 1 and one end of the meander-like conductor 27 are in electrical contact via the inner annular metal coating 28.

At one point inside the outer sheath 4 is located a recess 30 which serves to hold a contact element 31. A contact pin 32 of the contact element 31, which is spring mounted, protrudes above the upper edge of the outer sheath 4 and is biassed towards the outer annular metal coating 29 when the ring wheel 17 is fully screwed onto the external thread 2 of the nozzle body 1. In order to be able to adjust the distance between ring wheel 17 and outer sheath 4 in the axial direction in the region of the above recess, there may be a distance piece 33 which is connected in one piece with either the outer sheath 4 or the ring wheel 17. In FIG. 3 it is connected to the outer sheath 4. The distance piece 33 is intended to prevent the meander-like conductor 27 from being damaged by the upper surface of the outer sheath 4 when the ring wheel 17 is screwed onto the nozzle body 1.

As is best shown by FIG. 4, which shows a plan view of the lower side of the ring wheel 17 with the outer sheath and nozzle body removed, the inner annular metal coating 28 and the outer annular metal coating 29 serve as current supply electrodes for the meander-like conductor 27 which is located above the annular groove 20 and extends in the longitudinal direction thereof. Since, as already mentioned, the screen potential is applied to the outer sheath 4, it is transmitted via the nozzle body 1 and the inner annular metal coating 28 to one end of the meander-like conductor 27. The other end of the meander-like conductor 27, which is connected to the outer annular metal coating 29, receives a different potential via the contact element 31, the contact pin 32 of which is in contact with the metal coating 29. This different potential is the measuring potential which is picked up via a resistance e.g. from the neutral conductor of the coaxial connector socket, that is, in the last instance from the nozzle electrode which is also connected to the neutral conductor of the coaxial connector socket. For this purpose therefore the contact element 31 is connected by a cable 34 to the resistance.

This resistance is usually connected between the neutral conductor of the coaxial connector socket and the shield thereof. It has a given resistance value and serves to identify the nozzle, for which the current flowing through it is measured. If this resistance is now disconnected from the shield and connected instead via the cable 34 to the contact element 31, then this end of the resistance will finally also be at screen potential, but via the meander-like conductor 27. With the resistance, therefore, identification of the nozzle can also take place when the current flowing through it is monitored, but at the same time if this flow of current is interrupted it can be ascertained that the ring wheel 17 is broken in the break-off region, as the meander-like conductor 27 in this case breaks too. In this way two functions can be fulfilled with one current monitoring means, namely identification of the nozzle and monitoring of the break-off point.

Figure 5:
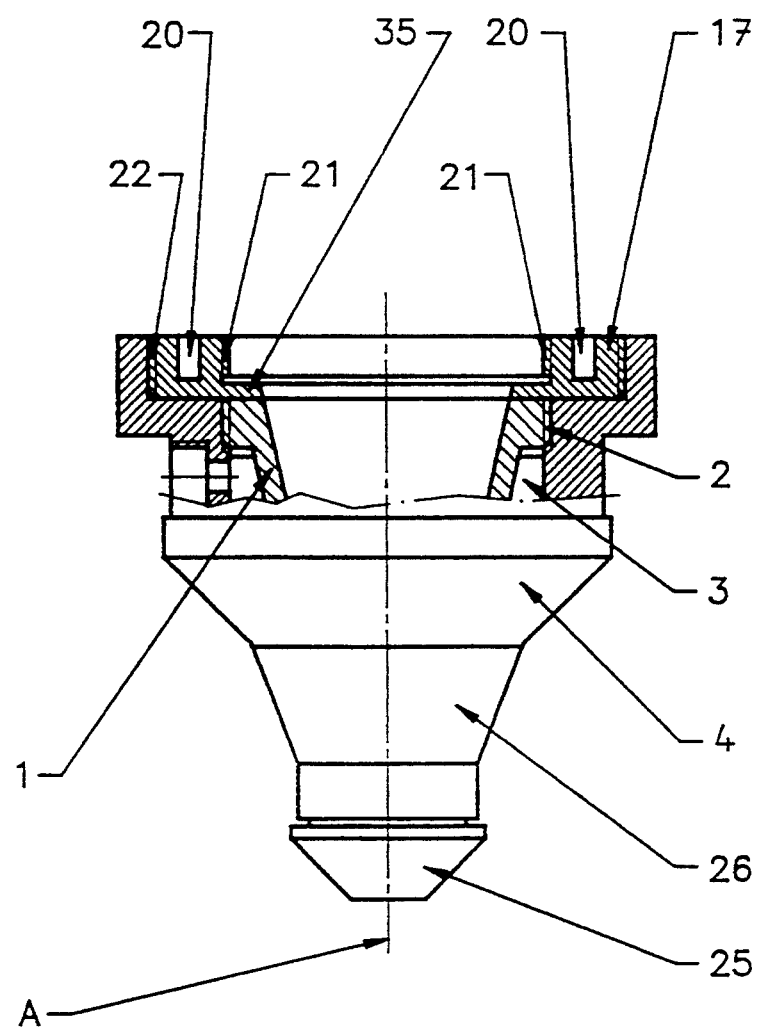

A third embodiment of the invention is shown by FIG. 5. The same parts as in FIG. 2 are here given the same reference numbers.

In the present case the nozzle body 1 is fully screwed by its external thread 2 into the opening 3 with the internal thread in the outer sheath 4. The outer sheath 4 is widened after the fashion of a flange in its upper end region and comprises an internal thread into which the ring wheel 17, which serves as a connecting element with a break-off region, can be screwed by its external thread 22. The ring wheel 17 in this case comes to lie completely within the outer sheath 4. It is further constructed in such a way that on its side facing towards the nozzle electrode 25 it comprises an attachment 35 which protrudes radially inwards and beyond its internal thread 21 and which practically covers the upper region of the nozzle body 1. The ring wheel 17, which is made of insulating material, thus insulates the nozzle body 1 from a metal cylinder, not shown, which is screwed from above into the internal thread 21 of the ring wheel 17 until it abuts against the flange 35. This cylinder then serves to fix the whole nozzle by means of the ring wheel 17 to the connector head. The cylinder may be for example a suitable attachment of the connector head, which comprises a corresponding external thread which mates with the internal thread 21.

Here too, monitoring of the break-off point 20 can be carried out by means of a meander-like conductor as in the case of FIGS. 3 and 4. Unlike the embodiment described there, however, the inner annular metal coating is now drawn so far radially inwards that it is electrically in contact with the nozzle body 1. In this way the screen potential is delivered via the nozzle body 1 and the inner annular metal coating to one end of the meander-like conductor. The other end of the meander-like conductor is connected to the measuring potential in the same way as in FIGS. 3 and 4 by a corresponding outer annular metal coating and the contact element.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Nozzle for a device for machining materials, which is rigidly connected at its end opposite a nozzle tip to a connector head of the device, wherein:
    the nozzle is connected to the connector head by a connecting element made of a brittle material, said connecting element being separable from the nozzle; and
    the connecting element comprises a break-off region, the connecting element is constructed as a cylinder which is coaxial with the longitudinal axis of the nozzle and a side wall of the connecting element has at least one peripheral groove defined therein forming the break-off region.

2. The nozzle according to claim 1, wherein the connecting element is provided with internal and external threads.

3. The nozzle according to claim 2, wherein the connecting element is screwed by its internal thread onto a nozzle body belonging to the nozzle and is connectable by its external thread to the connector head.

4. The nozzle according to claim 2, wherein the connecting element is screwed by its external thread into the nozzle and is connectable by its internal thread to the connector head.

5. The nozzle according to claim 1, wherein the connecting element is made of electrically insulating material and the break-off region is crossed by an electrical conductor which breaks if the break-off region breaks.

6. The nozzle according to claim 5, wherein the electrical conductor is formed by deposition of electrically conductive material.

7. The nozzle according to claim 6, wherein the electrical conductor overlaps the break-off region in a meander-like fashion in the longitudinal direction thereof.

8. The nozzle according to claim 5, wherein the electrical conductor is connected in series with a resistance and the resistance is attached to one of the connecting element and the nozzle.

9. The nozzle according to claim 5, wherein the electrical conductor is made of resistance material.

10. The nozzle according to claim 1, wherein the connecting element is made of polyvinylene sulphide.

11. The nozzle according to claim 1, wherein the connecting element is made of ceramic material.

12. The nozzle according to claim 1, wherein the nozzle is positioned within a cap which leaves the tip of the nozzle free and which is attached to the connector head and of which the inner surface is metallised.

13. The nozzle according to claim 12, wherein the cap is made of Teflon.

14. The nozzle according to claim 5, wherein the electrical conductor is constructed as a wire strain gauge.

15. The nozzle according to claim 5, wherein the nozzle is connectable to an electrical monitoring circuit which monitors the current through at least one of the electrical conductor and the current between the nozzle tip and an inner metal coating of a cap to which the nozzle is connected.

16. The nozzle according to claim 1, wherein the at least one peripheral groove comprises a first groove and a second groove, the first groove is located in an outer wall of the cylinder and the second groove is located in an inner wall of the cylinder.

17. The nozzle according to claim 16, wherein the first and second groove are longitudinally displaced with respect to the longitudinal axis of the nozzle.

18. Nozzle for a device for machining materials, which is rigidly connected at its end opposite a nozzle tip to a connector head of the device, wherein the nozzle is connected to the connector head by a connecting element made of a brittle material and the connecting element comprises a break-off region, the connecting element is constructed as a ring wheel having flat wheel surfaces, the ring wheel being coaxial with the longitudinal direction of the nozzle and at least in one of the flat wheel surfaces comprises at least one coaxial annular groove forming the break-off region.

19. The nozzle according to claim 18, wherein the connecting element is provided with internal and external threads.

20. The nozzle according to claim 19, wherein a ring flange is screwed onto the external thread, the ring flange is made of fracture-resistant material and is located in the wheel plane of the connecting element.

21. The nozzle according to claim 19, wherein the connecting element is screwed by its internal thread onto a nozzle body belonging to the nozzle and is connectable by its external thread to the connector head.

22. The nozzle according to claim 18, wherein the connecting element is made of electrically insulating material and the break-off region is crossed by an electrical conductor which break if the break-off region breaks.

23. The nozzle according to claim 22, wherein the electrical conductor is formed by deposition of electrically conductive material.

24. The nozzle according to claim 23, wherein the electrical conductor overlaps the break-off region in a meander-like fashion in the longitudinal direction thereof.

25. The nozzle according to claim 22, wherein the electrical conductor is connected in series with a resistance and the resistance is attached to one of the connecting element and the nozzle.

26. The nozzle according to claim 22, wherein the electrical conductor is made of resistance material.

27. The nozzle according to claim 18, wherein the nozzle is positioned within a cap which leaves the tip of the nozzle free and which is attached to the connector head and of which the inner surface is metallised.

28. The nozzle according to claim 22, wherein the electrical conductor is constructed as a wire strain gauge.

29. The nozzle according to claim 22, wherein the nozzle is connectable to an electrical monitoring circuit which monitors the current through at least one of the electrical conductor and the current between the nozzle tip and an inner metal coating of a cap to which the nozzle is connected.

* * * * *